United States Patent [19]

Lance

[11] Patent Number: 4,709,651

[45] Date of Patent: Dec. 1, 1987

[54] WHISTLE

[75] Inventor: Mark A. Lance, Melbourne, Australia

[73] Assignee: W.A. Deutsher Proprietary Limited, Moorabbin, Australia

[21] Appl. No.: 896,123

[22] Filed: Aug. 13, 1986

[30] Foreign Application Priority Data

Aug. 14, 1985 [AU] Australia .............................. PH1937

[51] Int. Cl.⁴ ................................................ G01K 5/00

[52] U.S. Cl. ................................ 116/137 R; 116/141; 446/204

[58] Field of Search .................... 116/137 R, DIG. 18, 116/DIG. 19, DIG. 44, 141; 446/202, 204, 206, 216; 84/330, 377-379, 381; 24/130, 129 R, 115 H; D21/64; D17/10, 12, 99

[56] References Cited

U.S. PATENT DOCUMENTS

| | | | |
|---|---|---|---|
| 394,243 | 12/1888 | Briggs | 446/206 |
| 1,059,630 | 4/1913 | Poefzsch | 24/130 |
| 1,426,945 | 8/1922 | Anderson | 24/130 |
| 1,723,057 | 8/1929 | Myers | 84/330 |
| 2,331,975 | 10/1943 | Hagopian | 84/330 |
| 2,555,833 | 6/1951 | Vanaman | 84/330 |
| 2,754,714 | 7/1956 | Folsom | 446/204 |
| 3,824,949 | 7/1974 | Aquila | 116/137 R |
| 4,194,714 | 3/1980 | Schultz | 248/308 |

FOREIGN PATENT DOCUMENTS

| | | | |
|---|---|---|---|
| 107442 | 2/1917 | United Kingdom | 116/137 R |

*Primary Examiner*—Charles Frankfort
*Assistant Examiner*—W. Morris Worth
*Attorney, Agent, or Firm*—J. P. O'Brien; T. W. Buckman

[57] ABSTRACT

A whistle having two chambers of different size so that each is capable of generating a sound different to that generated by the other. Each chamber is elongate and has an open mouth located at the same end of the whistle body. A mouthpiece extends angularly from that end of the body and has two open-ended passages extending therethrough, each of which has an open inner end located adjacent a respective one of the chamber mouths. The two passages are located in close side by side relationship and are arranged so that a stream of air emerging from their respective inner ends passes across a respective one of the two chamber mouths so that the two chambers generate sound simultaneously. The two chambers generate relatively high and low frequency sound respectively.

3 Claims, 9 Drawing Figures

WHISTLE

BACKGROUND OF THE INVENTION

This invention relates to whistles as used for signalling purposes. Such whistles are used for a variety of purposes, but it will be convenient to hereinafter describe the invention with particular reference to whistles as used for distress signalling purposes.

Whistles of the foregoing kind are commonly attached to life jackets to provide a means of producing an audible signal if the wearer of the jacket is in a distress situation. Such whistles are also carried by hikers, campers and others who might be caught in difficult circumstances in a remote location.

A problem with whistles of the foregoing kind is that they do not project the generated sound over a sufficient distance and/or do not generate sound of a level such as to be audible over a range of circumstances.

It is an object of the present invention to provide an improved whistle of the foregoing kind. It is a particular object of the invention to provide such a whistle which is able to transmit a signal over a relatively large distance and at a noise level such that the potential for detection is relatively high.

A whistle according to the invention is characterised in that it includes at least two sound producing chambers which are arranged to produce relatively high and low frequency sounds respectively. In a preferred arrangement, the sound range of the whistle is such as to substantially cover the upper and lower limits of human hearing. For example, the frequency range of the whistle may be between 2 and 8 kilohertz with a maximum decibel rating of 113 decibels at 2.5 kilohertz.

An advantage of high frequency sound is that it tends to cut through background interference, but it has the disadvantage of dispersing rapidly and therefore travels over a limited distance. Low frequency sound on the other hand travels over a relatively long distance, but tends to be masked by background noise. A whistle of the foregoing kind therefore has the advantage of producing sound which travels well and is also discernible over background noise.

The foregoing characteristics can be embodied in whistles of various forms. It will be convenient, however, to hereinafter describe the invention with reference to one particular form of whistle.

SUMMARY OF THE INVENTION

In accordance with the invention, there is provided a whistle including, a body, at least two chambers formed within said body and each having an open mouth which is located adjacent the open mouth of the other said chamber, one of said chambers being larger than the other, a mouthpiece attached to said body, and at least one open-ended passage extending through said mouthpiece and having an inner open end thereof located adjacent said chamber mouths, the arrangement being such that a stream of air directed through said passage to emerge from said inner end thereof passes across each said open mouth to cause a sound to be generated by each said chamber, and the sound generated by one chamber is different to that generated by the other.

The body and the chambers are preferably elongate in the same general direction, and it is further preferred that the mouthpiece has two passages extending therethrough so that a respective passage is provided for each chamber. The mouthpiece, and consequently the passages therethrough, preferably extends at an angle relative to the longitudinal axis of the body as that tends to optimise the noise generating characteristics of the whistle.

A embodiment of the invention is described in detail in the following passages of the specification which refer to the accompanying drawings. The drawings, however, are merely illustrative of how the invention might be put into effect, so that the specific form and arrangement of the various features as shown is not to be understood as limiting on the invention.

DESCRIPTION OF PREFERRED EMBODIMENT

Figure 1:
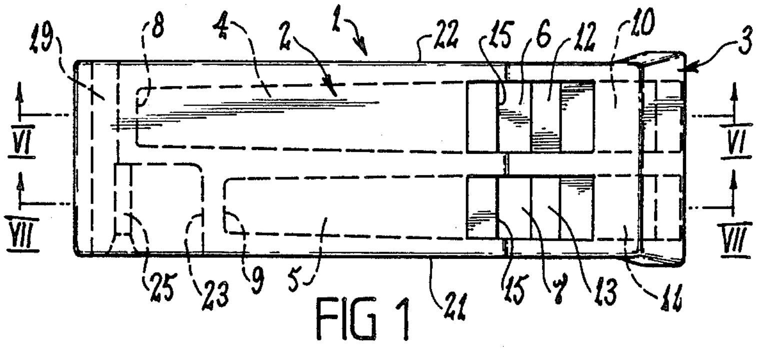
FIG. 1 is a top plan view of a whistle according to one embodiment of the invention.
Figure 2:
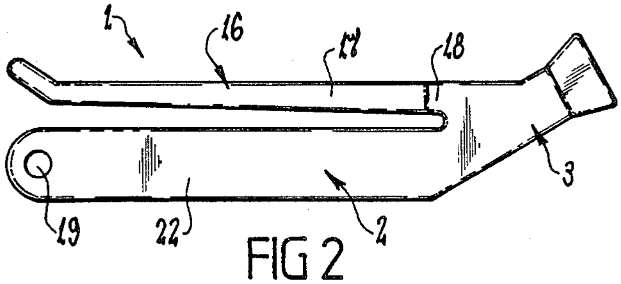
FIG. 2 is a side elevation view of the whistle shown in FIG. 1.
Figure 3:
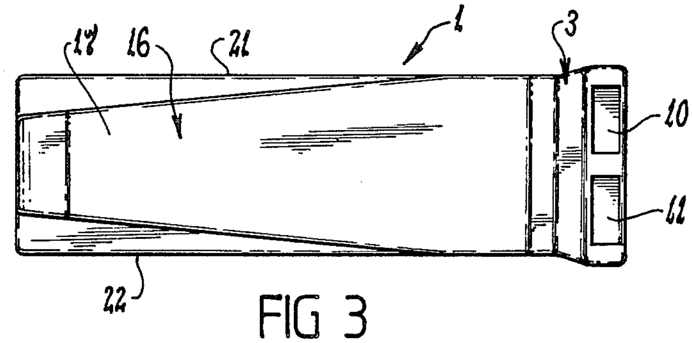
FIG. 3 is an underneath plan view of the whistle shown in FIG. 1.
Figure 4:
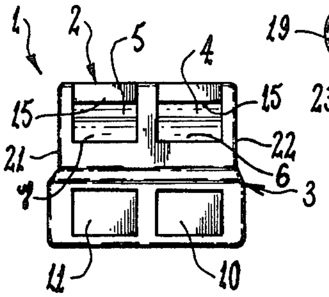
FIG. 4 is an end view of the whistle shown in FIG. 1.
Figure 5:
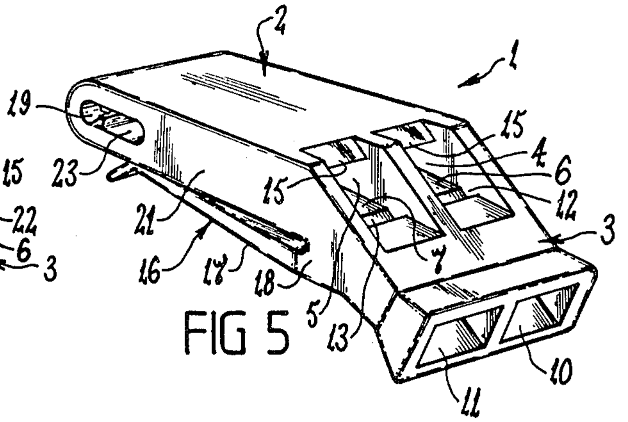
FIG. 5 is a perspective view of the whistle shown in FIG. 1.

In the example embodiment shown, the whistle 1 is formed of a plastics material and is made as a single piece moulding. Whistles formed of plastics material have generally been moulded in two parts, which are subsequently secured together by welding or the like, and it is a feature of the embodiment hereinafter described that it can be made as a single piece moulding thereby avoiding the cost and inconvenience of a post-moulding assembly step.

The whistle body 2 is elongate and in the form shown is of rectangular shape in transverse cross-section, although other cross-sectional shapes can be adopted. A mouthpiece 3 is provided at one end of the body 2 and, as shown, that mouthpiece 3 preferably extends angularly relative to the longitudinal axis of the body 2 for a reason hereinafter made clear. An angular relationship of something within the range of 30° to 45° inclusive has been found satisfactory.

Two sound producing chambers 4 and 5 are formed within the body 2 and they preferably extend in close side-by-side relationship and in the longitudinal direction of the body 2 as shown. The chambers 4 and 5 are of different size so that each is adapted to produce sound of a frequency different to that of the sound produced by the other chamber. In the construction shown, that size difference is achieved by making the chamber 4 longer than the chamber 5. The chambers 4 and 5 as shown are of substantially rectangular shape in transverse cross-section, but other cross-sectional shapes may be adopted, and it is preferred that they each progressively reduce in cross-sectional size in the direction away from the mouthpiece 3. Each chamber 4 and 5 has an open mouth 6 and 7 respectively which is located at or adjacent the junction between the body 2 and the mouthpiece 3, and a closed end 8 and 9 respectively located remote from the mouthpiece 3. The mouths 6 and 7 are preferably of substantially the same size.

The mouthpiece 3 extends angularly downwardly away from the chamber mouths 6 and 7 and has two passages 10 and 11 extending therethrough in close side by side relationship and generally in the longitudinal direction of the body 2. Each passage 10 and 11 is open-ended and is arranged so that a stream of air blown through it to emerge from the respective inner open end 12 or 13, will pass across a respective one of the sound producing chamber mouths 6 and 7. The arrangement is therefore such that when a person is using the whistle 1, two separate airstreams will be generated through the mouthpiece passages 10 and 11 and each will pass across the open mouth 6 or 7 of a respective one of the chambers 4 and 5 so that sound will be produced simultaneously by both chambers 4 and 5. The angular disposition of the mouthpiece 3 causes the generated noise to be directed away from the user in such a way as to allow for maximum noise level over a relatively long distance.

Figure 6:
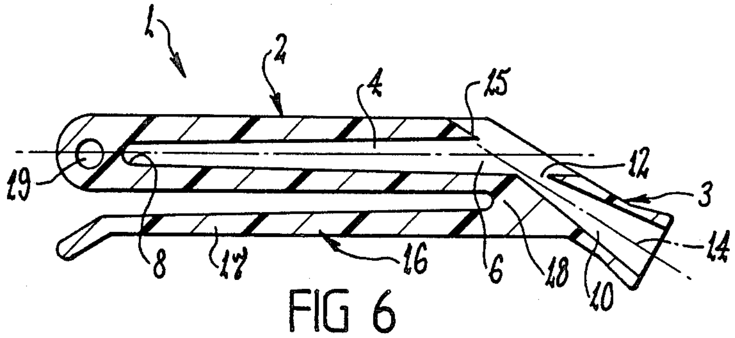
FIG. 6 is an enlarged cross-sectional view taken along line VI—VI of FIG. 1.
Figure 7:
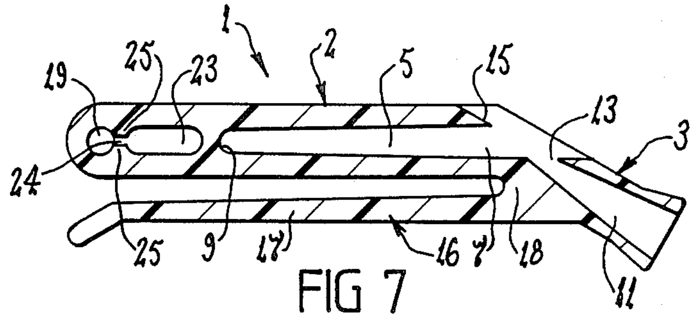
FIG. 7 is an enlarged cross-sectional view taken along line VII—VII of FIG. 1.
Figure 8:
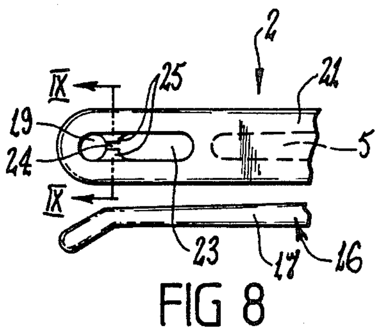
FIG. 8 is an enlarged side elevational view of one end portion of the whistle shown in FIG. 1.
Figure 9:
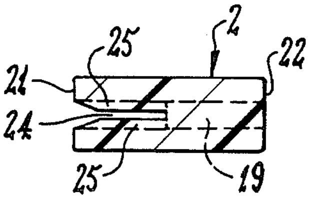
FIG. 9 is a cross-sectional view taken along line IX—IX of FIG. 8.

As will be evident from FIG. 6, the open mouth 6 and 7 of each of the chambers 4 and 5 is located in a plane which is substantially parallel to, and preferably contains, the longitudinal axis 14 of each of the mouthpiece passages 10 and 11. Furthermore, a thin wedge-shaped edge 15 is preferably formed at the side of each mouth 6 and 7 which is remote from the passage inner ends 12 and 13, and the airstream emerging from each passage 10 and 11 strikes a respective one of those edges 15.

A whistle 1 as described may incorporate other features of advantage. For example, as shown, an integral clip 16 may be provided on the underside of the body 2 so as to provide means for conveniently attaching the whistle 1 to clothing, a strap, a belt, or other sheet-like material. The clip 16 shown includes a flat plate-like member 17 connected at 18 to the body 2 at or adjacent the junction between the body 2 and the mouthpiece 3 and extending away from that connection 18 in the longitudinal direction of the body 2. It is preferred that the clip member 17 and/or its connection 18 has some degree of flexibility to permit material of different thicknesses to be interposed between the clip member 17 and the whistle body 2.

It is also preferred that a cord passage 19 be provided through the end 20 of the body 2 remote from the mouthpiece 3 and, as shown, that passage 19 may extend transverse of the body 2 between the longitudinal sides 21 and 22 thereof. Furthermore, cord securing means may be provided adjacent one end of the cord passage 19 to enable a cord end to be secured without the need for a knot in that end. According to the arrangement shown, that cord securing means includes a cavity 23 in the side 21 of the whistle body 2 and a cord jamming slot 24 located between that cavity 23 and the adjacent end portion of the cord passage 19. The cord jamming slot 24 is formed between opposed sloping surfaces of two ribs 25 formed at one side of the cavity 23. Preferably, the arrangement is such that the jamming slot 24 progressively reduces in size inwardly of the body 2 and provides communication between the cavity 23 and the cord passage 19.

With the foregoing arrangement, a cord end can be passed laterally from the cord passage 19 through the slot 24 and forced towards the narrow end of that slot 24 so as to be secured against withdrawal. On the other hand, the secured end of the cord can be conveniently released from the cord jamming slot 24 when it is desired to separate the cord from the whistle 1.

It is also preferred to make the whistle 1 from a material such that it will float in water. One suitable material for that purpose is polypropylene.

Although the whistle has been described as having two chambers, it will be apparent that it could have three or more chambers if desired. Also, a separate mouthpiece passage for each chamber may not be necessary, as a single passage could serve more than one chamber. Changes of the foregoing kind, however, are generally not necessary or not preferred.

A whistle as described has several valuable advantages over prior whistles of the same kind. Apart from the novel sound generating feature, the whistle is convenient to manufacture and is able to be secured in any of a variety of ways.

Various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. A whistle formed as a one-piece molding, comprising an elongated body having first and second lengthwise extending sound producing chambers arranged in a side-by-side contiguous relationship, an open mouth of each of said chambers being located at one end of said body, a closed end of each of said chambers being located at a second end of said body, said first chamber being substantially longer in length than said second chamber in order to permit said first and second chambers to simultaneously produce a sound in a low and high frequency range respectively, a mouthpiece extending angularly from said one end of said body, first and second open ended passages formed through said mouthpiece and arranged so that each passage has an inner end located adjacent the open mouth of a respective one of said chambers, each said passage being arranged so that a stream of air passing therethrough emerges from said inner end thereof to pass in a straight path across the adjacent open mouth of said respective one of said chambers, said path having a direction which is angularly disposed relative to a longitudinal direction of the respective one of said chambers, each passage of said mouthpiece thereby directing the produced sound of said respective one of said chambers forwardly of said elongate body, and said passages being arranged so that air blown into said mouthpiece passes simultaneously through each said passage, a clip formed integral with said elongate body and comprising a flat plate-like member which is attached to said body at said one end of said body to produce a resilient relationship between said body and said clip, and a cord attaching means provided in said elongated body comprising a third passage extending through the body in a direction transverse to said longitudinal direction of said chambers, said third passage being disposed adjacent said closed ends of said lengthwise extending chambers.

2. A whistle according to claim 1 wherein said mouthpiece inclines away from said one end of said body at an angle in the range of 30 to 45 degrees inclusive and wherein a thin wedge-shaped edge is formed at a side of each said chamber mouth which is remote from said inner end of respective passages, and said passages extend angularly relative to said body so that said emerging air streams strike each said edge and the produced sound of each said chamber is directed forwardly of said elongated body.

3. A whistle formed as a one-piece plastic molded construction comprising an elongate body and an integrally formed mouthpiece portion extending from one end of said body at an obtuse angle relative to the length of said body, a flexible plate-like member integrally connected at one end with said mouthpiece portion and extending generally parallel in a slight spaced-apart relation from said elongate body to define a whistle clip, said elongate body having first and second lengthwise extending sound producing chambers arranged in a side-by-side contiguous relationship, an open mouth of each of said chambers being located at one end of said body, said first chamber being substantially longer in length than said second chamber in order to permit said first and second chambers to simultaneously produce a sound in a low and high frequency range respectively, a mouthpiece extending angularly from said one end of said body, two open ended passages formed through said mouthpiece and arranged so that each passage has an inner end located adjacent the open mouth of a respective one of said chambers, each said passage being arranged so that a stream of air passing therethrough emerges from said inner end thereof to pass in a straight path across the adjacent open mouth of said respective one of said chambers, said path having a direction which is angularly disposed relative to a longitudinal direction of the respective one of said chambers, each passage of said mouthpiece thereby directing the produced sound of said respective one of said chambers forwardly of said elongate body and said passages being arranged so that air blown into said mouthpiece passes simultaneously through each said passage.

* * * * *